United States Patent
Visser et al.

(10) Patent No.: US 8,666,330 B2
(45) Date of Patent: Mar. 4, 2014

(54) ANTENNA SWITCH WITH ESD ISOLATION

(75) Inventors: Hendrik Visser, Wijchen (NL); Berend Hendrik Essink, Varsseveld (NL)

(73) Assignee: ST-Ericsson SA, Plan-les-Ouates (CH)

( * ) Notice: Subject to any disclaimer, the term of this patent is extended or adjusted under 35 U.S.C. 154(b) by 190 days.

(21) Appl. No.: 13/045,848

(22) Filed: Mar. 11, 2011

(65) Prior Publication Data

US 2012/0083224 A1  Apr. 5, 2012

Related U.S. Application Data

(60) Provisional application No. 61/388,217, filed on Sep. 30, 2010.

(51) Int. Cl.
*H04B 1/44* (2006.01)

(52) U.S. Cl.
USPC .................................. 455/83; 455/78; 455/88

(58) Field of Classification Search
USPC ..................... 455/78, 83, 88, 277.1
See application file for complete search history.

(56) References Cited

U.S. PATENT DOCUMENTS

| | | | | |
|---|---|---|---|---|
| 6,919,858 B2 * | 7/2005 | Rofougaran | | 343/850 |
| 7,391,596 B2 * | 6/2008 | Khorram | | 361/58 |
| 8,050,634 B2 * | 11/2011 | Olsson et al. | | 455/78 |
| 2008/0014878 A1 | 1/2008 | Rofougaran | | |
| 2009/0264084 A1 | 10/2009 | Olsson et al. | | |
| 2009/0268358 A1 | 10/2009 | Farbarik et al. | | |
| 2009/0305647 A1 | 12/2009 | McKay et al. | | |

FOREIGN PATENT DOCUMENTS

| | | |
|---|---|---|
| EP | 1301017 A1 | 4/2003 |
| WO | 2009127616 A1 | 10/2009 |
| WO | 2010070401 A1 | 6/2010 |

* cited by examiner

*Primary Examiner* — Tuan H Nguyen
(74) *Attorney, Agent, or Firm* — Coats & Bennett, P.L.L.C.

(57) ABSTRACT

A triple winding balun is combined with multiple switch assemblies to implement an antenna switch that provides good isolation, low loss, and good linearity with only a minor increase to the overall chip footprint. The antenna switch also isolates the receiver from power surges, where the power surges may be due to electrostatic discharge, undesirable WiMAX/LTE signals, etc. An exemplary antenna switch comprises a triple winding balun, a first switch subassembly, and an optional second switch subassembly. During stand-by and transmit modes, the first and second switch subassemblies respectively isolate the receiver from transmitter output current and connect a positive voltage bias to the third winding to prevent negative voltage swings at the receiver. During the receive mode, the configuration of the first and second switch subassemblies flips to connect the receiver to the third winding of the balun and to isolate the receiver from power surges.

23 Claims, 7 Drawing Sheets

ANTENNA SWITCH WITH ESD ISOLATION

This application claims priority to Provisional U.S. Patent Application 61/388,217 filed 30 Sep. 2010, which is incorporated herein by reference.

The invention described herein relates generally to isolating a receiver from power surges, and more particularly to using an antenna switch to isolate the receiver from electrostatic discharge and/or high frequency power surges.

BACKGROUND

Transceivers having a single antenna for transmitting and receiving signals typically use an antenna switch to switch the antenna between the transmitter and receiver. Typical antenna switches connect either the transmitter or receiver to the antenna while also isolating the transmitter and receiver from each other. Generally, the loss caused by the switch and the isolation provided by the switch drives the antenna switch design. Other parameters, e.g., power consumption, power handling capability, and/or linearity, may also be considered.

In addition to isolating the transmitter and receiver from each other, an antenna switch may further isolate the transmitter and/or receiver from undesirable power surges that may damage the transmitter and/or receiver, e.g., power surges caused by electrostatic discharge (ESD). When a transceiver chip includes separate transmit and receive pins, a clamp at the receive pin input protects the receiver from power surges. A clamp may also be used to protect the transmitter. For example, when the transmitter uses a pull-up inductor, a clamp may be placed at the supply side of the inductor, not at the transmit-side, so that the inductor acts as a short for power surges. Because the transmitter comprises a large device, it generally will survive any power surge signals applied at the transmit side of the transmitter.

While a clamp provides good surge protection for transceivers having separate transmit and receive pins on the IC chip, such clamps do not provide a good power surge solution when the transceiver combines the transmit and receive pins at one pin on the chip. In this scenario, a clamp applied to the receiver input will limit the transmit output power; the clamp will simply rectify the RF levels. Thus, an alternate solution is desired.

The size of the antenna switch also represents another design consideration, especially given that integrating a switch in sub-micron CMOS processes has become quite popular. The low supply voltage associated with such CMOS solutions, however, may be problematic. A peak transmission voltage associated with a high transmission power that exceeds the switch supply voltage limits the functionality of the switch. For example, when the transmit power level exceeds the switch supply voltage, parasitic devices present in the switch start conducing, which causes strong non-linearity, high losses, and compression effects.

One way to address this problem comprises connecting the switch to a ¼ wave length stub, or equivalently to a resonant LC tank coil. Such solutions have low loss, (less than 1 dB), provide good isolation (more than 20 dB), provide good linearity, and provide good power handling. This solution, however, requires an undesirably large area inductor. Both the ¼ wavelength stub and the equivalent LC tank coil are generally large, particularly relative to the other components on the active area of the chip. As chip components continue to decrease in size, the size of the active area likewise continues to decrease, which makes the size of the stub/coil even more dominant. At some point, ¼ the wavelength stub/LC tank coil dominates the chip size so much that further attempts at reducing the size of the chip have diminishing returns.

While various other techniques may be used to avoid the problems associated with conventional antenna switches integrated via sub-micron CMOS processes, such techniques generally require additional voltages and/or special layout structures with switches in a biased well. The additional voltages may undesirably increase the power consumption of the device, while biased well switches may undesirably cause latch-up.

In view of the problems with conventional antenna switches, there remains a need for alternative antenna switches that do not overly increase the size of a transceiver chip layout while still providing low loss, good isolation, good linearity, good power surge protection, etc.

SUMMARY

The invention described herein combines a triple winding balun with at least one switch assembly to implement an antenna switch that provides good isolation, low loss, and good linearity with only a minor increase in the overall chip footprint. Further, the antenna switch described herein isolates the receiver from power surges, where the power surges may be due to electrostatic discharge, undesirable WiMAX/LTE signals, etc.

The antenna switch embodiments disclosed herein comprise a triple winding balun and a switch subassembly. During stand-by and transmit modes, the switch subassembly disconnects the receiver from the balun to isolate the receiver from transmitter output current. During the receive mode, the switch subassembly connects the receiver to the third winding of the balun to connect the receiver to the antenna and isolate the receiver from power surges.

In one exemplary embodiment, the balun comprises first, second, and third windings respectively coupled to a transmitter, antenna, and receiver. The switch subassembly connects to the receiver and connects in parallel with the third winding. During the transmit mode, the switch subassembly disconnects the third winding from the receiver to isolate the receiver from the transmitter and antenna. During the receive mode, the switch subassembly connects the third winding to the receiver and at least one isolation unit to isolate the receiver from power surges. The isolation unit clamps one or more receiver inputs to protect the receiver from undesirable surges, e.g., from ESD and/or other high frequency signals not filtered by the balun, e.g., WiMAX/LTE signals. In one exemplary embodiment, the isolation unit comprises a pair of diodes connected back-to-back between a receiver input and ground. It will be appreciated that the antenna switching system disclosed herein may be used for transceivers using single-ended and/or differential amplifiers.

Some embodiments may further include an optional second switch subassembly. The second switch subassembly is coupled between the third winding and a first supply voltage, e.g., a receiver supply voltage. During a transmit mode, the second switch subassembly connects the third winding to the first supply voltage to bias the third winding. In so doing, the second switch subassembly prevents negative voltage swings at the receiver input during the transmit mode. During the receive mode, the second switch subassembly disconnects the third winding from the first supply voltage.

The following also describes an exemplary method for switching an antenna connected to a transmitter and a receiver via a triple winding balun between the transmitter and the receiver. During a transmit mode, the method includes disconnecting the third winding from the receiver to respectively bias the third winding to the supply voltage and isolate the receiver from the transmitter and antenna. During a receive mode, the method includes connecting the third winding to the receiver to activate at least one isolation unit to isolate the receiver from power surges while the receiver receives signals from the antenna.

DETAILED DESCRIPTION

Figure 1:
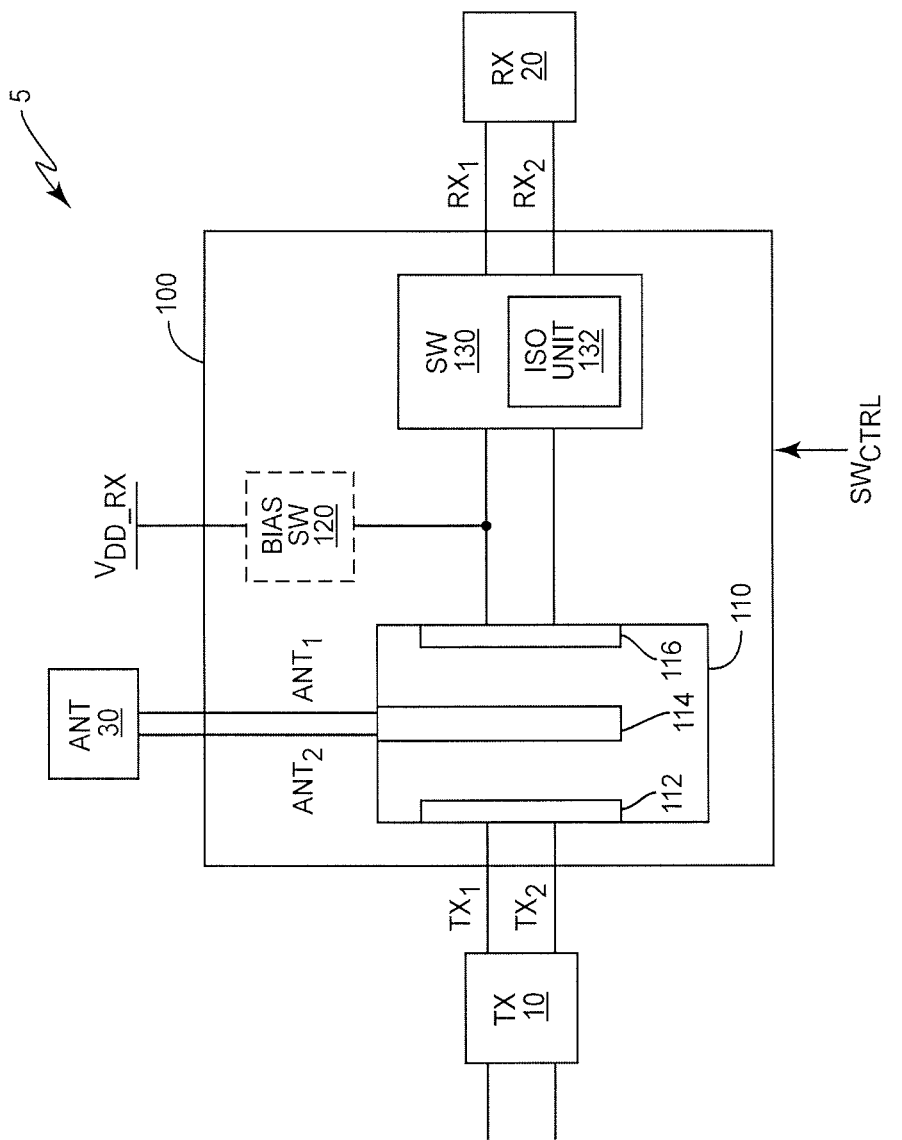
FIG. 1 depicts a block diagram of a transceiver with an antenna switch according to one exemplary embodiment disclosed herein.

FIG. 1 depicts a block diagram of a transceiver 5 including a transmitter 10, receiver 20, and antenna 30 interconnected by an antenna switch 100. While FIG. 1 generally represents a differential transmitter 10 and receiver 20, those skilled in the art will appreciate that the present invention also applies to single-ended transmitters 10 and/or receivers 20.

The antenna switch 100 includes balun 110, an optional bias switch 120, and an isolation switch 130. While the following describes the antenna switch 100 in terms of the bias switch 120 and the isolation switch 130, it will be appreciated that the antenna switch 100 disclosed herein does not require the bias switch 120, or even the supply voltage connection at the receiver input. Balun 110 comprises a triple winding balun, where a transmitter winding 112 connects to the transmitter 10, a receiver winding 116 connects to the receiver 20, and an antenna winding 114 disposed between the transmitter and receiver windings 112, 116 connects to the antenna 30. In general, windings 112, 114, 116 are configured based on the operating frequencies of the transmitter 10 and receiver 20 so as to connect the antenna 30 to the transmitter 10 and disconnect the antenna 30 from the receiver 20 during the transmit mode, and to connect the antenna 30 to the receiver 20 and disconnect the antenna 30 from the transmitter 10 during the receive mode. Because a standard balun (dual winding) already exists on chip for the transmitter 10, and because adding a third winding does not require any additional chip area, the triple winding balun 110 disclosed herein does not increase the size of the chip area over existing designs.

Power surges are dangerous to both the receiver 20 and transmitter 10. Antenna switch 100 not only connects the antenna 30 to the transmitter 10 during the transmit mode and to the receiver 20 during the receive mode, the antenna switch 100 also protects the transmitter 10 and receiver 20 from various power surges. For example, the antenna winding 114 acts like a low-frequency short. Because the balun 110 does not transfer signals having a frequency less than 1 GHz very well, power surges having such lower frequencies do not pass to the transmitter 10 or receiver 20. For example, the balun 110 may suppress signals having a frequency below 1 GHz by ~10 dB, and may suppress signals having a frequency below 100 MHz by ~30 dB. Thus, antenna winding 114 protects the transmitter 10 and receiver 20 from low frequency power surges, e.g., those caused by low frequency ESD events, including machine model (MM) and human body model (HBM) events. However, the balun 110 does not short power surges caused by higher frequency content, e.g., higher frequency ESD events including charge device model (CDM) events, which have a 1 GHz ramp time. In addition to possible high frequency ESD events, a WiMAX/LTE signal (e.g., at 2.6 GHz) physically injected at the antenna 30 causes power surges of up to 30 dBm peak. As WiMAX/LTE is at the center frequency of the balun 110, the balun 110 does not filter/attenuate such high frequency signals. In addition, other high frequency power surge events, e.g., those caused by GSM signals, may happen that are at least partially visible at the transmitter and receiver terminals of the balun 110. During the transmit mode, isolation switch 130 isolates the receiver from such high frequency power surges by disconnecting the receiver from the balun 110. The transmitter 10 generally does not require additional surge protection during the transmit mode as the relatively large transmitter 10 will generally survive the power surges presented to the transmitter pin. During the receive mode, however, when isolation switch 130 connects the receiver 20 to the receiver winding 116 of the balun 110, the isolation switch 130 connects an isolation unit 132 to the receiver winding 116 to protect the receiver 20 from the high frequency power surges.

Figure 2:
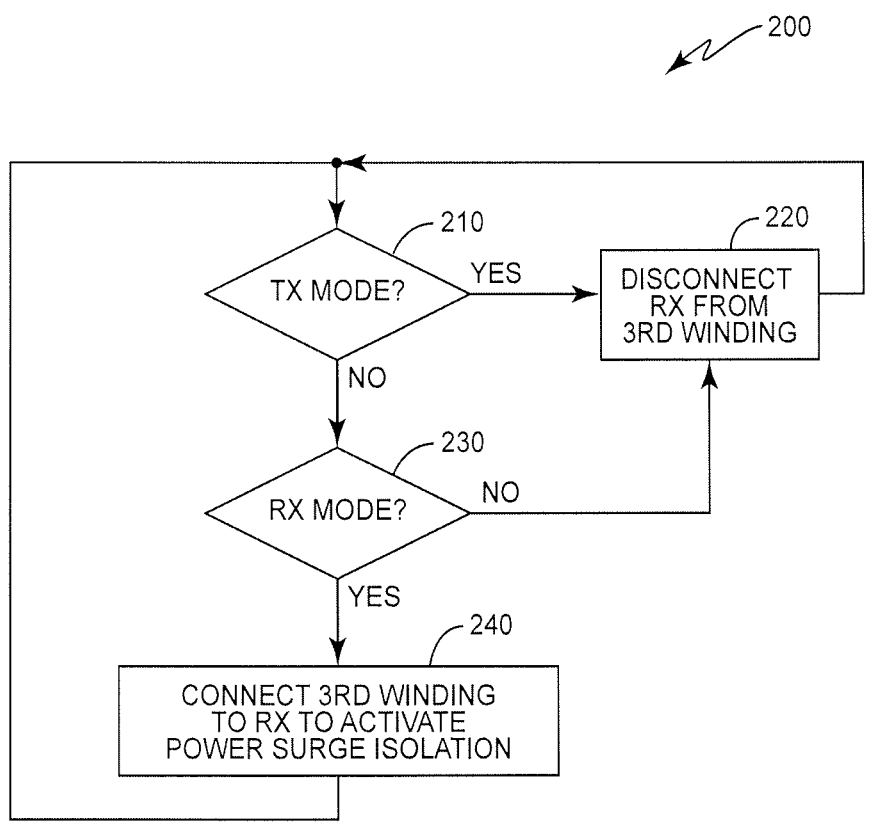
FIG. 2 depicts a process for switching an antenna between a transmitter and a receiver depending on the operating mode of the transceiver according to one exemplary embodiment disclosed herein.

FIG. 2 depicts a process diagram that details the general operation of antenna switch 100. During the transmit mode (block 210), the isolation switch 130 is disabled to physically disconnect the receiver 20 from the balun 110 (block 220). In so doing, the isolation switch 130 isolates the receiver 20 from current induced in the receiver winding 116 due to transmission signals output by the transmitter 10, as discussed further herein. If included, bias switch subassembly 120 is enabled during the transmit mode to connect the receiver winding 116 to a supply voltage to bias the receiver winding 116 at the supply voltage, e.g., at the receiver supply voltage $V_{DD\_RX}$, which prevents negative voltage swings at the input of the receiver 20. During the receive mode (block 230), the isolation switch 130 is enabled to connect the receiver to the receiver winding 116 (block 240). In so doing, isolation switch 130 connects receiver 20 to antenna 30 while also providing power surge protection for the receiver 20 (block 240). If included, bias switch subassembly 120 is disabled during the receive mode to disconnect the receiver winding 116 from the supply voltage. The process repeats as long as the antenna switch 100 is in operation.

Figure 3:
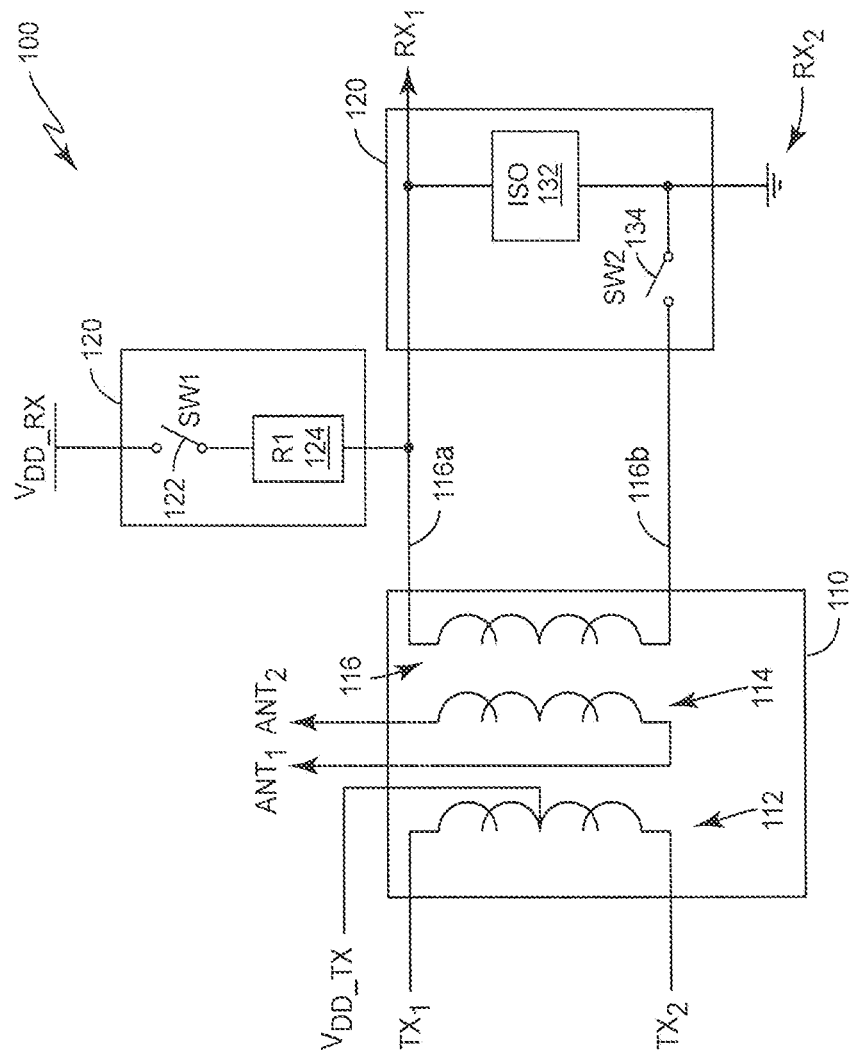
FIG. 3 depicts a more detailed block diagram of the antenna switch of FIG. 1 for a single-ended receiver according to one exemplary embodiment.

FIG. 3 depicts a block diagram for an exemplary antenna switch 100 that selectively connects a differential transmitter 10 and a single-ended receiver 20 to antenna 30. In this embodiment, the receiver winding 116 comprises opposing first and second ends 116a, 116b respectively connected to the input ($RX_1$) and ground ($RX_2$) of the single-ended receiver 20. Bias switch 120 comprises a switch SW1 122 and an impedance element, e.g., a resistor R1 124, connected between a receiver supply voltage $V_{DD\_RX}$ and the first end 116a of the receiver winding 116. It will be appreciated that R1 124 may be disposed on either side of SW2 122. Isolation switch 130 comprises an isolation unit 132 connected between the receiver input $RX_1$ and the receiver ground $RX_2$, and a switch SW2 134 connected between a second end 116b of the receiver winding 116 and the receiver ground RX$_2$. Table 1 summarizes the state of the switches 122, 134 based on the operating mode.

TABLE 1

| Operating Mode | SW1 | SW2 |
|---|---|---|
| Stand-by | Closed | Open |
| Transmit | Closed | Open |
| Receive | Open | Closed |

FIG. 3 depicts the preferred location of isolation unit 132, e.g., after SW2 134. By positioning isolation unit 132 as depicted in FIG. 3, an open SW2 134 disconnects both the receiver 20 and isolation unit 132 from the balun 110. It will be appreciated, however, that the present invention does not require such placement of the isolation unit 132. For example, isolation unit 132 may be located before SW2 134.

During the transmit mode, the transmitter 10 outputs a transmit signal to the transmitter winding 112, which induces current in the antenna winding 114 and the receiver winding 116. Terminating antenna 30 at ANT$_2$ allows the current to start flowing in ANT$_1$ to output the desired transmit power. The open state of SW2 134, which disconnects the receiver ground RX$_2$ from the receiver winding 116, isolates the receiver 20 from the current induced in the receiver winding 116 and from any power surges.

While the open state of SW2 132 prevents current from flowing, the current induced in the receiver winding 116 still causes a voltage to build up across the receiver winding terminals 116a, 116b. This voltage level depends on the transmit power of the transmitter 10 and the load impedance of the receiver 20. For example, a transmit power of +13 dBm average, with peaks up to +16 dBm, translates into a 4 V peak-to-peak voltage swing when the receiver load has a impedance of 50Ω. As the receiver 20 generally has a lower supply voltage, e.g., 1.8 V, a 4 V peak-to-peak swing causes multiple problems. For example, parasitic devices in SW2 134 start conducting when signal levels at the receiver winding 116 exceed the supply voltage or are negative, which causes strong nonlinearity, high losses, and compression effects. To prevent these problems, the antenna switch 100 may include the bias switch subassembly 120, where SW1 122 connects R1 124 to a desired voltage, e.g., V$_{DD\_RX}$, during the transmit mode to bias the receiver winding 116 at the desired voltage. For example, V$_{DD\_RX}$=2 V results in a voltage swing for the above example of 0 to 4 V, which should not cause any problems for receiver 20.

During the receive mode, SW1 122 opens and SW2 134 closes. While this enables the receiver 20 to receive and process the signals received by antenna 30, it also exposes the receiver 20 to power surges not filtered/attenuated by the balun 110, e.g., higher frequency ESD events and/or WiMAX signals. Isolation unit 132 provides additional protection against such high frequency power surges, by clamping any remaining high frequency power surge signals, e.g., high frequency ESD, WiMAX, etc. Isolation unit 132 may comprise any suitable clamp, e.g., two diodes 133 connected back-to-back as depicted in FIG. 4.

During a stand-by mode when both the transmitter 10 and the receiver 20 are inactive, power surges may cause current to be induced in the windings 112, 114, 116 of the balun 110. To protect the receiver 20 against such power surges, the stand-by mode of the antenna switch 100 is therefore configured the same as the transmit mode, e.g., with SW1 122 closed and SW2 134 open to bias the receiver winding 116 and to isolate the receiver 20, respectively, as discussed above.

Figure 4:
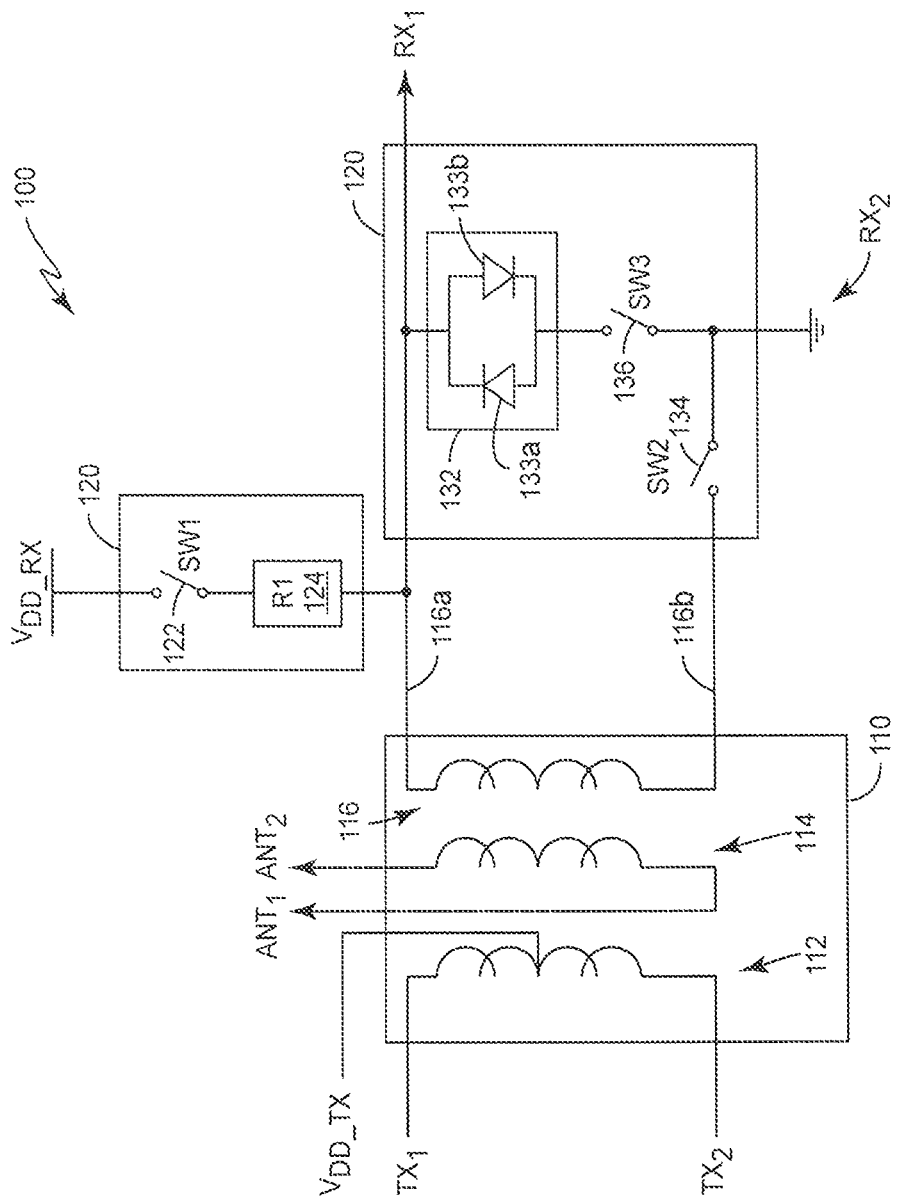
FIG. 4 depicts a more detailed block diagram of the antenna switch of FIG. 1 for a single-ended receiver according to another exemplary embodiment.

FIG. 4 depicts an alternate embodiment of the antenna switch 100, where isolation switch 130 includes an additional switch SW3 136 connected between the isolation unit 132 and the receiver ground RX$_2$. The bias switch 120, SW2 134, and isolation unit 132 of FIG. 4 operate the same as described herein with respect to FIG. 3. During the transmit and standby modes, SW3 136 opens to prevent current from V$_{DD\_RX}$ due to the closed state of SW1 122 from conducting, which saves power. During the receive mode, SW3 136 closes to connect the isolation unit 132 to the receiver 20. It will be appreciated that antenna switch 100 does not require SW3 136 to function. Instead SW3 closes during the receive mode to facilitate the power surge protection, and opens during the transmit/stand-by modes to prevent unnecessary power consumption. Table 2 summarizes the state of the switches 122, 134, 136 based on the operating mode.

TABLE 2

| Operating Mode | SW1 | SW2 | SW3 |
|---|---|---|---|
| Stand-by | Closed | Open | Open |
| Transmit | Closed | Open | Open |
| Receive | Open | Closed | Closed |

SW2 134 comprises a large switch that may be implemented using NMOS technology. The switch SW2 134 generally has finite impedance at 2.5 GHz, at which a minimum current will start flowing through the receiver winding 116. SW2 134 should not be too large, however, as it still needs to provide sufficient isolation at 2.5 GHz when SW2 134 is open (a large switch results in less isolation due to parasitic capacitances of the switch). If SW2 134 is too large, the parasitic capacitance will be too large, which results in there being little to no difference between the open and closed state of the switch. For example, when SW2 134 has a width of 2,000 μm, it has an isolation of ~15 dB and a loss of ~0.7 dB. When SW2 134 has a width of 20,000 μm, it has a loss of ~0.2 dB, which improves the receiver sensitivity by ~0.5 dB, but also has a degraded isolation, e.g., ~6 dB. Such a low isolation will undesirably allow too much of the transmission signal to appear at the receiver 20, and therefore cause distortion.

Figure 5:
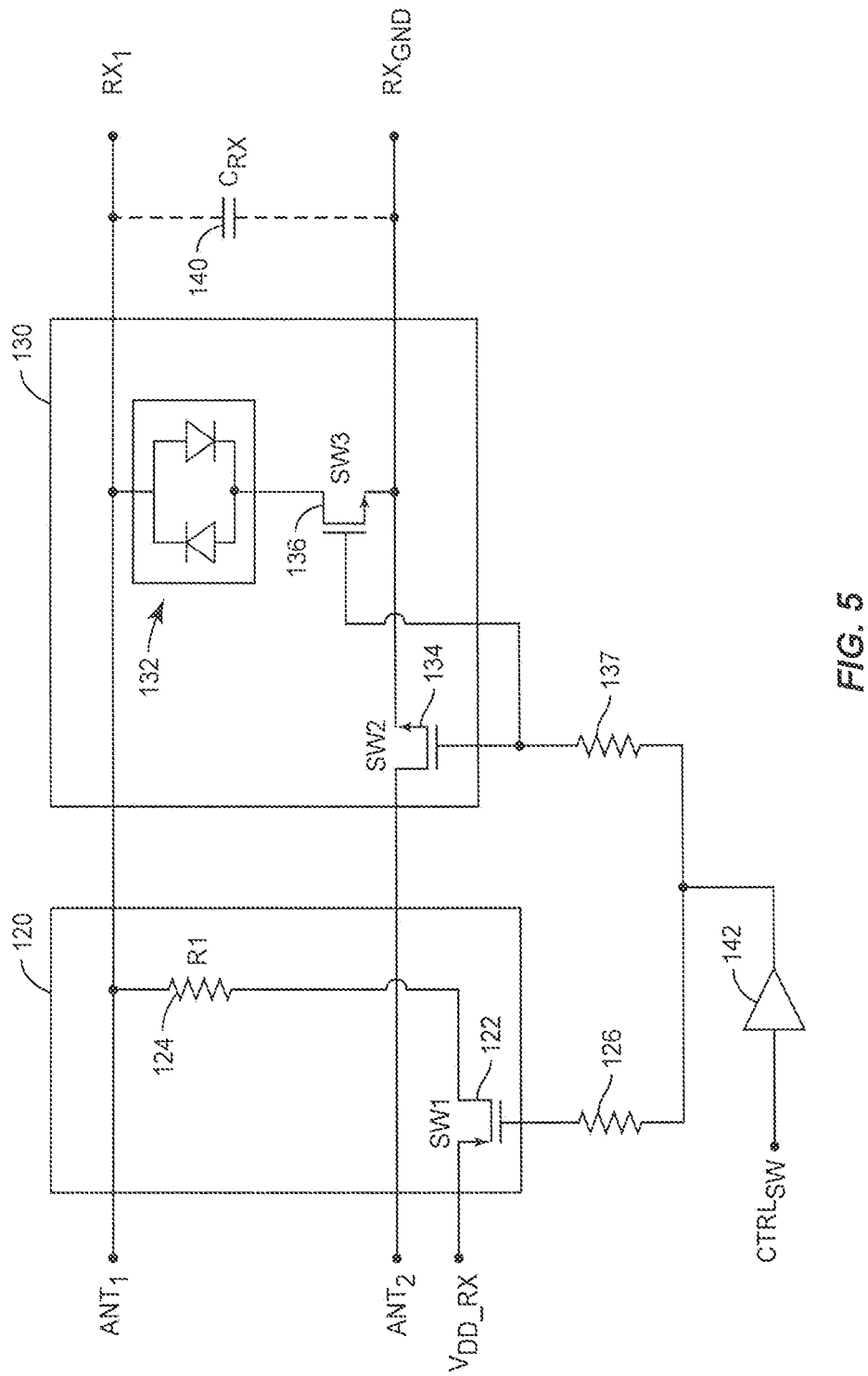
FIG. 5 depicts an exemplary circuit diagram for the antenna switch of FIG. 4.

FIG. 5 depicts an exemplary circuit diagram for the antenna switch 100 of FIG. 4, wherein a single control signal CTRL$_{SW}$ controls all three switches 122, 134, 136. In this embodiment, SW1 122 comprises a small PMOS switch (e.g., ~2 μm wide), SW2 134 comprises a large NMOS switch (e.g., ~2000 μm wide), and SW3 136 comprises a medium switch (e.g., ~250 μm wide). Thus, implementing antenna switch 100 requires only one large switch, SW2 134, and two smaller switches, SW1 122 and SW3 136. As noted above, closing SW1 122 biases the open receiver winding 116 to help avoid negative voltages at the receiver 20. SW2 134 and SW3 136 open when SW1 122 closes, and vice versa, as shown in Table 2. The circuit of FIG. 5 includes an optional tuned capacitor C$_{RX}$ 140. It will be appreciated, however, that antenna switch 100 does not require C$_{RX}$ 140 to function. The gates of SW1 122, SW2 134, and SW3 136 connect to 8.5 kΩ resistors 126, 137 in series to isolate RF from the supply. One inverter 142 drives SW1 122, SW2 134, and SW3 136 responsive to the switch control signal CTRL$_{SW}$.

Figure 6:
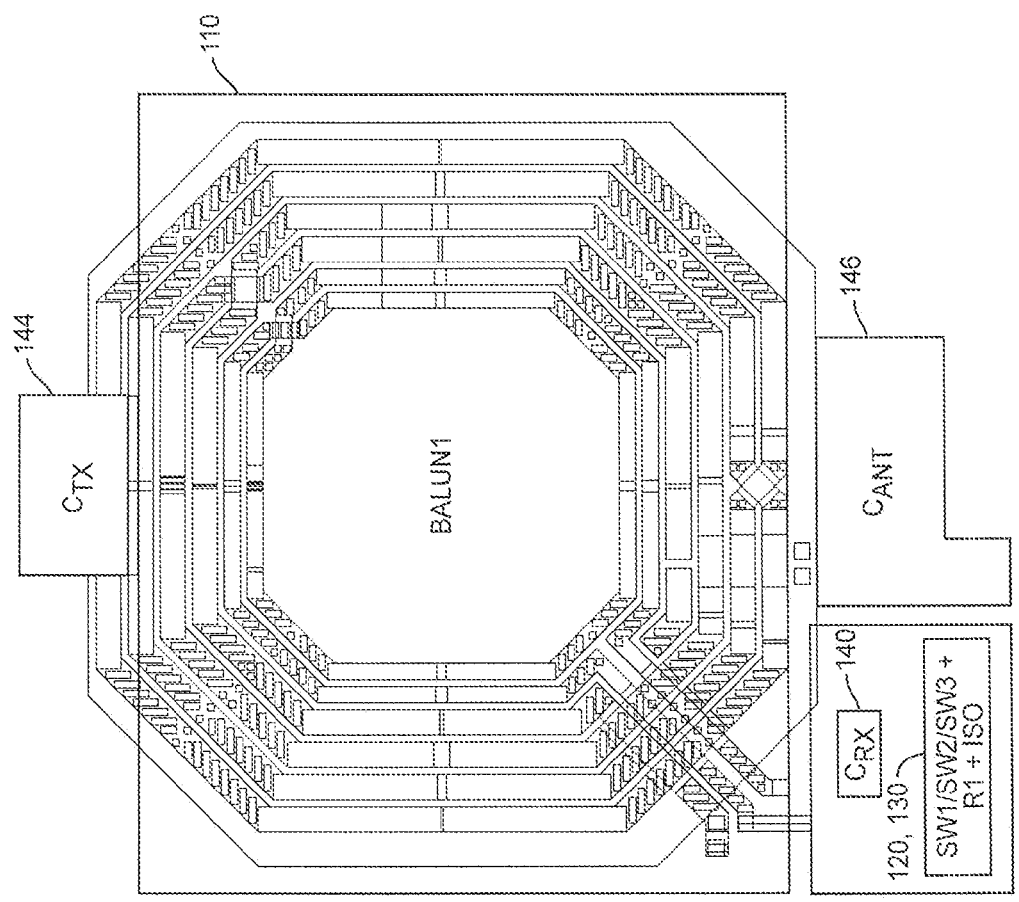
FIG. 6 depicts an exemplary chip layout for the antenna switch of FIG. 4.

FIG. 6 depicts an exemplary chip layout for antenna switch 100. The top block includes a capacitor C$_{TX}$ connected between the differential output terminals TX$_1$, TX$_2$ of the transmitter 10, which tunes the transmitter 10. The middle block includes the triple winding balun 110. The bottom left block includes the interconnected bias and isolation switches 120, 130 and a tuning capacitor $C_{RX}$ 140 for the receiver 20, respectively, where the NMOS switch SW2 134 takes up half of the chip area for the bottom left block. The bottom center block includes a tuning capacitor $C_{ANT}$ for the antenna 30. It will be appreciated that while tuning capacitors 140, 144, 146 facilitate the performance of the antenna switch 100, the antenna switch 100 described herein does not require such capacitors.

Table 3 lists some performance results for the antenna switch 100 disclosed herein.

TABLE 3

| Parameter | Result |
|---|---|
| Transmit mode loss due to antenna switch 100 | 0.5 dB (mainly due to receiver winding 116) |
| Receive mode loss due to antenna switch 100 | 2.0 dB (mainly due to receiver winding 116 and SW2 134) |
| Isolation of receiver 20 during transmit mode | 12 dB |
| Receiver matching | −14 dB |
| 0.1 dB compression point | 18.4 dBm |

These results indicate that antenna switch 100 provides acceptable loss and isolation during transmit and receive operating modes. Further, the compression point of 18.4 dBm indicates antenna switch 100 provides excellent power handling capability. It will be appreciated that trade-offs may be made between the transmit/receive losses and power handling.

Figure 7:
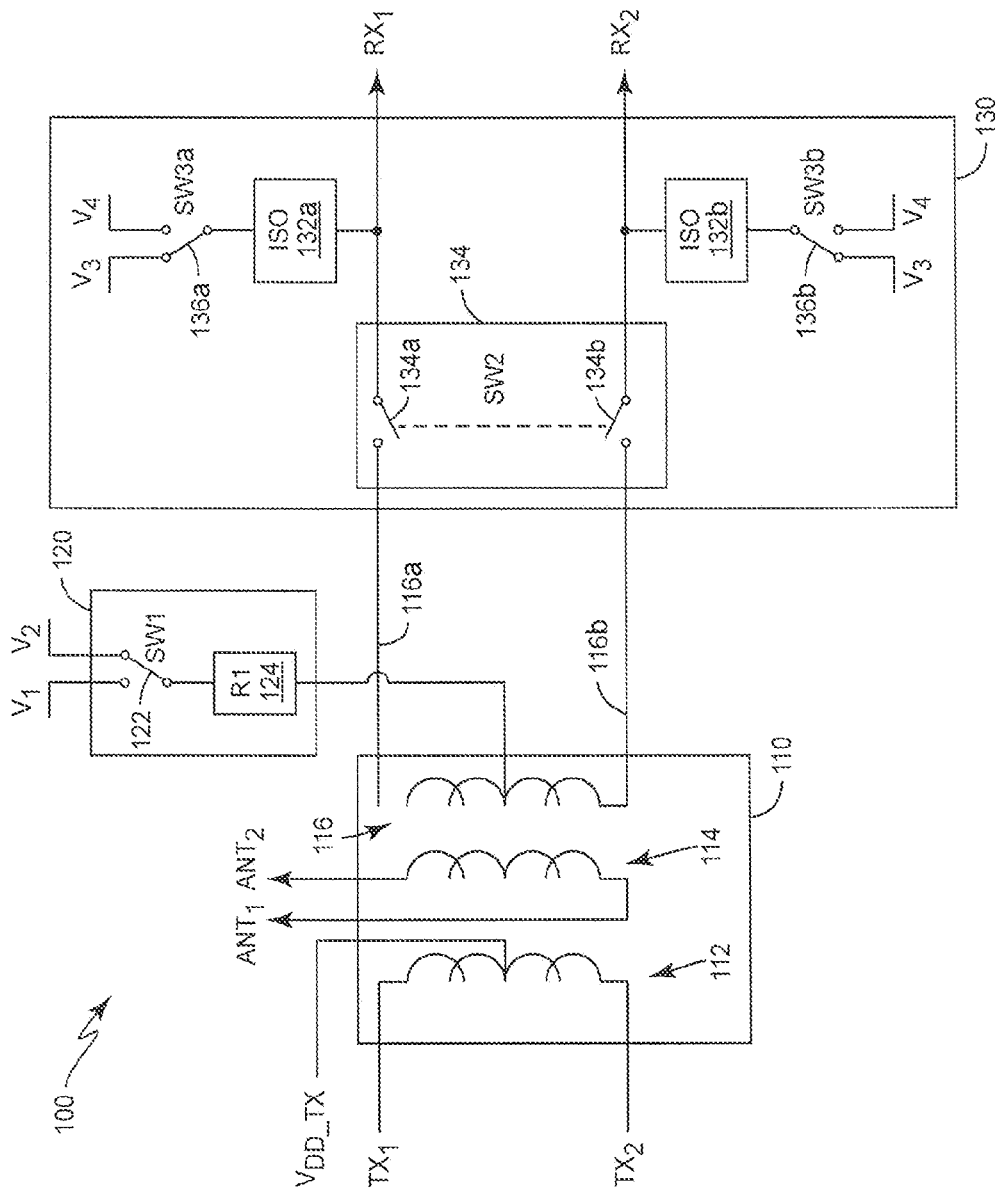
FIG. 7 depicts a more detailed block diagram of the antenna switch of FIG. 1 for a differential receiver according to another exemplary embodiment.

FIG. 7 depicts an alternative embodiment for the antenna switch 100 that accommodates a differential receiver 20. The differential solution of FIG. 7 still biases the third winding during transmit and stand-by modes, and adds the isolation unit 132 during the receive mode to improve ESD/interferer robustness. In this embodiment, the center tap of the receiver winding 116 provides voltage V1 or V2 to the terminals of the third winding, depending on the operating mode of the transceiver 5. For example, in a receive mode, SW1 122 connects the center tap of receiver winding 116 to V1, while in a transmit mode, SW1 122 connects the center tap of receiver winding 116 to V2. In addition, antenna switch 100 duplicates isolation unit 132, SW2 134, and SW3 136 for each of the differential inputs of the receiver 20, where all of the switches may be controlled with the same control, e.g., $CTRL_{SW}$. During the transmit mode, SW2 134 opens while switches SW3a 136a, SW3b 136b respectively connect isolation units 132a, 132b to V3. During the receive mode, SW2 134 closes while switches SW3a 136a, SW3b 136b respectively connect isolation units 132a, 132b to V4. Supply voltages V1 and V3 are selected to provide good isolation to SW2 134 during the transmit mode, while supply voltages V2 and V4 are selected for biasing the receiver 20 and/or providing the best surge protection. Those skilled in the art will appreciate that other combinations of SW1/SW3 and voltages V1/V2/V3/V4 may be used. It will further be appreciated that Table 2 still applies to the embodiment of FIG. 7, and that FIG. 7 depicts the switches in the transmit mode/standby configuration.

The antenna switch 100 described herein provides several advantages over conventional switches. First, the main advantage of the antenna switch 100 is the chip area savings provided by re-using chip area already allocated to elements present, e.g., the balun 110. As understood by those skilled in the art, a balun with two or three windings uses the same chip area. Thus adding a third winding to an already existing dual-winding balun does not require any additional chip area. While the antenna switch 100 does require adding one large NMOS switch SW2 134 (or two for the differential receiver 20 FIG. 7), the size of the added switch(es) is small in comparison to the size of the coils required for conventional switch solutions that protect the transceiver elements from power surges. The good surge protection and galvanic isolation provided by the triple-winding balun 110 represent additional advantages provided by switch 100.

While preferred embodiments of the antenna switch 100 include bias switch subassembly 120, it will be appreciated that the antenna switch 100 does not require bias switch subassembly 120 to operate. In some embodiments, e.g., those with lower transmit powers, the bias switch subassembly 120 may be excluded all together. Alternatively, SW2 122 may be excluded from the bias switch subassembly 120 so that the receiver winding 116 is biased during all operating modes at the expense of a higher current consumption during the receive mode.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An antenna switch for switching an antenna between a transmitter during a transmit mode and a receiver during a receive mode, said antenna switch comprising:
    a balun comprising first, second, and third windings respectively connected to the transmitter, antenna, and receiver; the first, second, and third windings comprising independent windings of the balun; and
    a first switch subassembly connected between a receiver input and the third winding, said first switch subassembly configured to connect the third winding to the receiver and at least one isolation unit during the receive mode to activate the at least one isolation unit to isolate the receiver from one or more power surges during the receive mode, and to disconnect the third winding from the receiver during the transmit mode to isolate the receiver from the transmitter and the antenna during the transmit mode.

2. The antenna switch of claim 1 wherein the first switch subassembly comprises a first switch and a first isolation unit, said first isolation unit connected between the receiver input and a receiver ground and configured to isolate the receiver from the one or more power surges, said first switch configured to connect the third winding to the receiver ground during the receive mode to connect the receiver to the antenna, and to disconnect the third winding from the receiver ground during the transmit mode to isolate the receiver from the transmitter and the antenna during the transmit mode.

3. The antenna switch of claim 2 wherein the first switch subassembly further comprises a second switch connected between the first isolation unit and the receiver ground, said second switch configured to connect the first isolation unit to the receiver ground during the receive mode to isolate the receiver from the one or more power surges during the receive mode, and to disconnect the first isolation unit from the receiver ground during the transmit mode to reduce power consumption during the transmit mode.

4. The antenna switch of claim 2 wherein the first isolation unit comprises a pair of diodes connected back-to-back between the receiver input and the receiver ground.

5. The antenna switch of claim 1 further comprising a second switch subassembly connected between a first supply voltage and the third winding, said second switch subassembly configured to connect the third winding to the first supply voltage during the transmit mode to bias the third winding to the first supply voltage during the transmit mode, and to disconnect the third winding from the first supply voltage during the receive mode.

6. The antenna switch of claim 5 wherein the second switch subassembly comprises an impedance element and a third switch, the third switch configured to connect the first supply voltage to the third winding via the impedance element during the transmit mode and to disconnect the first supply voltage from the third winding during the receive mode.

7. The antenna switch of claim 1 wherein the second winding is configured to reduce the one or more power surges having a frequency below 100 MHz by at least 25 dB.

8. The antenna switch of claim 1 wherein
the receiver comprises a differential receiver having differential inputs; and
the first switch subassembly is configured to connect opposing ends of the third winding to respective ones of the differential inputs during the receive mode to activate the at least one isolation unit, and to disconnect the third winding from the differential inputs during the transmit mode.

9. The antenna switch of claim 8 wherein the first switch subassembly comprises first, second, and third switches and first and second isolation units,
wherein during the transmit mode the first switch disconnects a first differential input from a first end of the third winding and disconnects a second differential input from a second end of the third winding, the second switch connects the first isolation unit between the first differential input and a first supply voltage, and the third switch connects the second isolation unit between the second differential input and the first supply voltage; and
wherein during the receive mode the first switch connects the first and second differential inputs to the first and second ends, respectively, of the third winding, the second switch connects the first isolation unit between the first differential input and a second supply voltage, and the third switch connects the second isolation unit between the second differential input and the second supply voltage.

10. The antenna switch of claim 9 wherein the first isolation unit comprises a first pair of diodes connected back-to-back and the second isolation unit comprises a second pair of diodes connected back-to-back, and wherein the first pair of diodes are connected between the first differential input and the first and second supply voltages, and the second pair of diodes are connected between the second differential input and the first and second supply voltages.

11. The antenna switch of claim 9 further comprising a second switch subassembly connected between the third winding and a third or fourth supply voltage, said second switch subassembly configured to connect the third winding to the third supply voltage during the transmit mode to bias the third winding to the third supply voltage during the transmit mode, and to connect the third winding to a fourth supply voltage during the receive mode to bias the third winding to the fourth supply voltage during the receive mode.

12. The antenna switch of claim 11 wherein the second switch assembly comprises an impedance element and a fourth switch, the fourth switch configured to connect the third supply voltage to the third winding via the impedance element during the transmit mode, and to connect the fourth supply voltage to the third winding via the impedance element during the receive mode.

13. The antenna switch of claim 11 wherein the first and third supply voltages are selected based on a desired isolation between the receiver and the transmitter and antenna during the transmit mode, and wherein the second and fourth supply voltages are selected based on at least one of a desired winding bias and a desired surge isolation for the receiver during the receive mode.

14. The antenna switch of claim 1 wherein the one or more power surges comprise at least one of an electrostatic discharge and a WiMAX/LTE signal.

15. A method of switching an antenna between a transmitter during a transmit mode and a receiver during a receive mode, said method comprising:
operatively connecting the transmitter, the antenna, and the receiver to first, second, and third windings of a balun respectively; the first, second, and third windings comprising independent windings of the balun;
during the transmit mode, disconnecting the third winding from the receiver to isolate the receiver from the transmitter and antenna; and
during the receive mode, connecting the third winding to the receiver to activate at least one isolation unit to isolate the receiver from one or more power surges.

16. The method of claim 15 wherein disconnecting the third winding from the receiver during the transmit mode comprises disconnecting the third winding from a receiver ground during the transmit mode, and wherein connecting the third winding to the receiver during the receive mode comprises connecting the third winding to the receiver ground during the receive mode.

17. The method of claim 16 wherein the at least one isolation unit comprises a first isolation unit coupled between a receiver input and the receiver ground, the method further comprising disconnecting the first isolation unit from the receiver ground during the transmit mode to reduce power consumption during the transmit mode, and connecting the first isolation unit to the receiver ground during the receive mode to isolate the receiver from the one or more power surges during the receive mode.

18. The method of claim 15 further comprising connecting the third winding of the balun to a first supply voltage to bias the third winding to the first supply voltage during the transmit mode, and disconnecting the third winding from the first supply voltage during the receive mode.

19. The method of claim 15 wherein the receiver comprises a differential receiver having first and second differential inputs, wherein connecting the third winding to the receiver during the receive mode comprises connecting opposing ends of the third winding to the respective first and second differential inputs of the receiver during the receive mode to activate the at least one isolation unit, and wherein disconnecting the third winding from the receiver during the transmit mode comprises disconnecting the opposing ends of the third winding from the first and second differential inputs during the transmit mode.

20. The method of claim 19 wherein the at least one isolation unit comprises first and second isolation units respectively connected to the first and second differential inputs, wherein connecting the third winding to the receiver during the receive mode further comprises:
during the transmit mode, connecting the first isolation unit between the first differential input and a first supply voltage, and connecting the second isolation unit between the second differential input and the first supply voltage; and during the receive mode, connecting the first isolation unit between the first differential input and a second supply voltage, and connecting the second isolation unit between the second differential input and the second supply voltage.

21. The method of claim 20 further comprising connecting the third winding to a third supply voltage during the transmit mode to bias the third winding to the third supply voltage during the transmit mode, and connecting the third winding to a fourth supply voltage during the receive mode to bias the third winding to the fourth supply voltage during the receive mode.

22. The method of claim 21 further comprising selecting the first and third supply voltages based on a desired isolation between the receiver and the transmitter and antenna during the transmit mode, and selecting the second and fourth supply voltages based on at least one of a desired winding bias and a desired surge isolation for the receiver during the receive mode.

23. The method of claim 15 further comprising configuring the second winding to reduce the one or more power surges having a frequency below 100 MHz by at least 25 dB.

* * * * *